US011249383B2

(12) United States Patent
Walker

(10) Patent No.: US 11,249,383 B2
(45) Date of Patent: Feb. 15, 2022

(54) FIRST PERSON SHOOTING CAMERA MOUNT

(71) Applicant: Drew Nolle Walker, Mesa, AZ (US)

(72) Inventor: Drew Nolle Walker, Mesa, AZ (US)

( * ) Notice: Subject to any disclaimer, the term of this patent is extended or adjusted under 35 U.S.C. 154(b) by 0 days.

(21) Appl. No.: 16/798,353

(22) Filed: Feb. 22, 2020

(65) Prior Publication Data

US 2020/0272044 A1 Aug. 27, 2020

Related U.S. Application Data

(60) Provisional application No. 62/809,734, filed on Feb. 24, 2019.

(51) Int. Cl.
*G03B 29/00* (2021.01)
*F41G 11/00* (2006.01)
*G03B 17/56* (2021.01)

(52) U.S. Cl.
CPC .............. *G03B 29/00* (2013.01); *F41G 11/00* (2013.01); *G03B 17/561* (2013.01)

(58) Field of Classification Search
USPC .......................................................... 396/428
See application file for complete search history.

(56) References Cited

U.S. PATENT DOCUMENTS

| | | | | |
|---|---|---|---|---|
| 3,614,439 A * | 10/1971 | Beelik, Jr. | ............... | G02B 23/12 250/332 |
| 3,709,124 A * | 1/1973 | Hunt | ...................... | G03B 29/00 396/426 |
| 3,785,261 A * | 1/1974 | Ganteaume | ................. | F41J 5/10 396/426 |
| 4,835,621 A * | 5/1989 | Black | .......................... | F41J 5/10 352/95 |
| 5,020,262 A * | 6/1991 | Pena | ....................... | G03B 29/00 42/106 |
| 5,026,158 A * | 6/1991 | Golubic | ..................... | F41G 1/38 356/252 |
| 6,000,163 A | 12/1999 | Gordon | | |
| 6,385,894 B1 * | 5/2002 | Podvin | ..................... | F41C 27/00 42/117 |
| 6,539,661 B2 * | 4/2003 | Hope | ....................... | F41C 27/00 42/119 |
| 8,046,950 B2 * | 11/2011 | Holmberg | .............. | F41G 11/003 42/106 |
| 8,296,991 B1 * | 10/2012 | Chung | ...................... | F41G 1/46 42/111 |

(Continued)

OTHER PUBLICATIONS

The Best Offset Iron Sights, American Firearms, www.americanfirearms.org/best-offset-iron-sights/, Dec. 19, 2020. (Year: 2020).*

*Primary Examiner* — Rodney E Fuller

(57) ABSTRACT

A camera mount system for a filming through an optic on a real or simulated gun while also allowing for accurate aiming is disclosed. The camera mount may have a gun engagement surface, a vertical positioning portion, camera housing, and a secondary sight and/or screen to film through the optic while the gun is aimed using the screen or secondary sight. Additionally, the camera mount may be adjustable along the horizontal, lateral, and vertical axes. The camera mount may utilize accessory rails to assist with attaching a secondary sight or incorporate a prism to use the optic being filmed through.

12 Claims, 10 Drawing Sheets

(56) References Cited

U.S. PATENT DOCUMENTS

| | | | | |
|---|---|---|---|---|
| 8,714,072 B1* | 5/2014 | Villarreal | F41G 1/02 | |
| | | | 89/41.05 | |
| 9,069,172 B1* | 6/2015 | Morley | G02B 23/12 | |
| 9,163,902 B1* | 10/2015 | Cheng | F41G 1/38 | |
| 10,042,243 B1* | 8/2018 | Metayer | H04N 5/2252 | |
| 10,534,166 B2* | 1/2020 | Summerfield | G02B 27/142 | |
| 2005/0241210 A1* | 11/2005 | Karcher | F41G 11/003 | |
| | | | 42/119 | |
| 2005/0252063 A1* | 11/2005 | Flannigan | G02B 23/04 | |
| | | | 42/119 | |
| 2005/0268521 A1* | 12/2005 | Cox | F41G 3/08 | |
| | | | 42/130 | |
| 2007/0214700 A1 | 9/2007 | Chang | | |
| 2008/0060248 A1* | 3/2008 | Pine | F41G 1/35 | |
| | | | 42/114 | |
| 2012/0106170 A1* | 5/2012 | Matthews | F41G 1/30 | |
| | | | 362/311.06 | |
| 2012/0240444 A1* | 9/2012 | Russell | F41G 3/165 | |
| | | | 42/90 | |
| 2014/0259853 A1* | 9/2014 | Crispin | F41G 1/38 | |
| | | | 42/124 | |
| 2014/0305022 A1* | 10/2014 | Chung | F41G 1/32 | |
| | | | 42/113 | |
| 2015/0107147 A1* | 4/2015 | Hurley | F41G 11/003 | |
| | | | 42/113 | |
| 2015/0292837 A1* | 10/2015 | Cheng | F41G 1/38 | |
| | | | 42/123 | |
| 2016/0018190 A1* | 1/2016 | Craven | H04N 5/23293 | |
| | | | 42/119 | |
| 2016/0047626 A1 | 2/2016 | Kremer et al. | | |
| 2016/0245621 A1* | 8/2016 | Kintzing | F41G 11/003 | |
| 2017/0010073 A1* | 1/2017 | Downing | F41G 3/165 | |
| 2017/0017139 A1* | 1/2017 | Kilic | G03B 17/565 | |
| 2017/0142301 A1* | 5/2017 | Simmon | F41G 11/00 | |
| 2017/0261286 A1* | 9/2017 | Galloway | F41J 5/10 | |
| 2017/0321990 A1* | 11/2017 | Taylor | F41G 11/003 | |
| 2017/0328677 A1* | 11/2017 | Gull | F41G 3/165 | |
| 2019/0301833 A1* | 10/2019 | Campbell | G03B 29/00 | |
| 2020/0033096 A1* | 1/2020 | Sabaldan Elpedes | F41G 1/35 | |
| 2020/0041890 A1* | 2/2020 | Peel | G03B 29/00 | |
| 2020/0124946 A1* | 4/2020 | Unger | G03B 17/566 | |
| 2020/0232762 A1* | 7/2020 | Hamilton | G02B 23/16 | |

\* cited by examiner

FIRST PERSON SHOOTING CAMERA MOUNT

CROSS-REFERENCE TO RELATED PATENT APPLICATIONS

This application claims the benefit of provisional patent application Ser. No. 62/809,734 filed Feb. 24, 2019 by the present inventor.

FIELD OF INVENTION

The present invention relates to a camera mount for use with real or simulated firearms.

BACKGROUND

Traditional camera mount systems made for use with real or simulated weapons do not allow the shooter to record through the weapon's sights while aiming. Current camera mounts block the shooter's visual access to the weapon's sights and make it difficult to simultaneously record and shoot with aimed fire. Additionally, filming through a weapon's optics is fraught with frustration and difficulty due to the challenge in placing the camera at the correct position relative to the optic to achieve focal clarity, the desired first-person perspective, and a steady point of view (POV). This POV perspective showing the optic as the shooter sees it, along with peripheral details (i.e. the areas proximal to or surrounding the optic and not just the optic's window itself) can be invaluable in many applications including but not limited to marketing, reviews, filming scenes in movies and television, and general demonstration of such optics. Additionally, this POV perspective also acts as a training aid to relay the perspective of the shooter. Presently, there is no practical or safe solution to allow for the shooter to aim and film through the sights.

SUMMARY

The present disclosure is directed to a system that enables the recording of video through a weapon's sights while still allowing for a means of aiming. This system may be succinctly described as, or called, a mount or a camera mount apparatus, and for the purposes herein either term mount may refer to the invention, yet the invention may comprise of much more than simply a mount itself but rather the system in its entirety. The mount may be configured to record video or pictures; when discussing "video recording" it is contemplated that capturing pictures or still shots may alternatively be done. Additionally, the mount may enable video recording through iron sights or optics including but not limited to magnified scopes, thermal optics, night vision, holographic optics, laser, or reflex sights. It is also contemplated that the term sight or optic may mean any manner of a means of aiming a firearm. The term firearm or gun may mean any real or simulated ranged weapon. In its ideal embodiment, the mount positions a camera at a favorable distance from and relative position to the optic with which the shooter desires to record through so that the video may capture the optic's entire sight picture in focus as well as capturing peripheral regions of the optic's edges. The mount may be affixed to the rails, frame, stock, or other engagement surfaces of the firearm.

It is an aspect of this mount to provide an easy, reliable, and convenient mounting solution for a camera to adapt firmly to a firearm or a component of a firearm to substantially eliminate unwanted movement in the form of shaking or wobbling while moving with the firearm or during firing. The mount may be affixed to the rails or slots or the firearm via its engagement surface. The mount's engagement surface may interface with various types of firearm engagement surfaces including but not limited to picatinny, dovetail, weaver, MLOK, or KeyMod. Additionally, the mount may engage via a quick disconnect, screw-on, or throw-lever means of attachment, thereby providing solid engagement between the mount and the firearm.

Additionally, it is an aspect of the invention to record through the desired optic mounted to the gun in addition to also recording the peripheral areas surrounding the optic including but not limited to the portion of the gun beneath the optic and the areas to the left and right of the optic. The mount must be positioned rearward of the optic being filmed to in a way that is not connected to the back of the optic thereby allowing the camera to see the peripheral areas. This perspective—one that captures both the optic's point of view as well as the peripheral areas creates a natural-looking video that reflects a shooter's actual perspective.

It is another aspect of the mount to position the lens or aperture of the camera at the ideal vertical height, lateral (side-to-side) position, and horizontal (forward/rearward) position necessary to capture footage with the optic's reticle virtually straight-on as the shooter would view the optic were the mount not present. It is yet another aspect of this mount to allow the user to adjust the mount's camera position—this is especially helpful and practical when using the mount to film through different makes and models of optics whose vertical reticle height (i.e. relative to the rail or bore axis) may be higher or lower than the height of the camera within the mount in its default height configuration. As a means of height adjustment (i.e. along the vertical axis), for example, the mount may include but is not limited to a series of adjustable riser plates. Adjusting the position of the mount along a forward/rearward (i.e. horizontal) axis allows the user to adjust the camera to the desired or optimal focal length to capture video through a magnified optic or flip magnifier. Additionally, it is another aspect of the invention to allow the lateral (i.e. side-to-side) camera to position to be adjusted. This may be highly desirable for cameras whose lens is off set from center or for filming optics where a subtle lateral adjustment would capture the optic's POV with optimal clarity and positioning. Vertical, lateral, and horizontal positioning of the mount may be done with any manner of adjustors which include but are not limited to positioning plates, sliding rails secured with tension via knobs, and spacers.

It is yet another aspect of the invention to allow for a means of aiming that is secondary to the optic being used to film through or by still allowing a means of aiming through the primary optic. This includes but its not limited to a secondary red dot, holographic, magnified sight, or iron sight (which may be referred to as a "secondary sight"). The secondary sight is ideally adjustable and zeroed to the same point of aim as the primary optic through which the mount is configured to record. The secondary sight may be on the lateral sides of the mount, vertical top of the mount, or even placed directly behind the mount (to be used in conjunction with a "shooting with both eyes open" technique commonly used with red dot or similar optics). In the case of a magnified optic, for example, alternative aiming means may include a screen synced to the camera allowing for the shooter to still view through the primary optic, especially when filming through a magnified optic and shooting out to greater ranges. Additionally, using a screen may be used in conjunction with a secondary sight especially when filming while engaging targets at various ranges, swapping from short to longer range shooting, and when filming through magnified optics. In the case of still allowing the ability to aim through the primary optic being filmed through, a prism or prism-like mirror (hereafter simply referred to as a prism) that allows light to take two pathways—one pathway reflecting light into the camera positioned off-center to the mount and another pathway allowing light to pass through the prism and into the shooter's eye thereby allowing the shooter to still see the primary optic. A prism within the mount can be used in conjunction with a secondary sight proximal to the mount—this is especially advantageous for use with low power variable optics (LPVO's) when the shooter may want to film at a 6 power magnification, but also want to engage targets quickly at close range using a secondary sight such as a micro red dot.

DRAWINGS—FIGURES

DRAWINGS—REFERENCE NUMERALS

| 10 | gun |
| 11 | horizontal axis |
| 12 | vertical axis |
| 13 | lateral axis |
| 14 | mount |
| 15 | accessory rail (gun) |
| 16 | optic |
| 17 | gun engagement surface |
| 18 | quick-release lever |
| 19 | vertical positioning portion |
| 20 | camera housing |
| 21 | camera |
| 22 | camera lens |
| 23 | gate |
| 24 | accessory rail (mount) |
| 25 | horizontal distance |
| 26 | optic viewing window |
| 27 | secondary sight |
| 28 | iron sight |
| 29 | screen |
| 30 | vertical adjustor |
| 31 | alternative adjustor |
| 32 | fasteners |
| 33 | lateral adjustor |
| 34 | holes |
| 35 | stock mount |
| 36 | swivel stud |

-continued

| 37 | alternative camera housing |
| 38 | handgun frame |
| 39 | back strap |
| 40 | magazine well |
| 41 | handgun |
| 42 | extension boom |
| 43 | slide |
| 44 | stock |
| 45 | prism |
| 46 | prism housing |
| 47 | prism-orientated camera housing |
| 48 | light pathway |
| 49 | camera function button |

DETAILED DESCRIPTION OF THE INVENTION'S EMBODIMENTS

Figure 1:
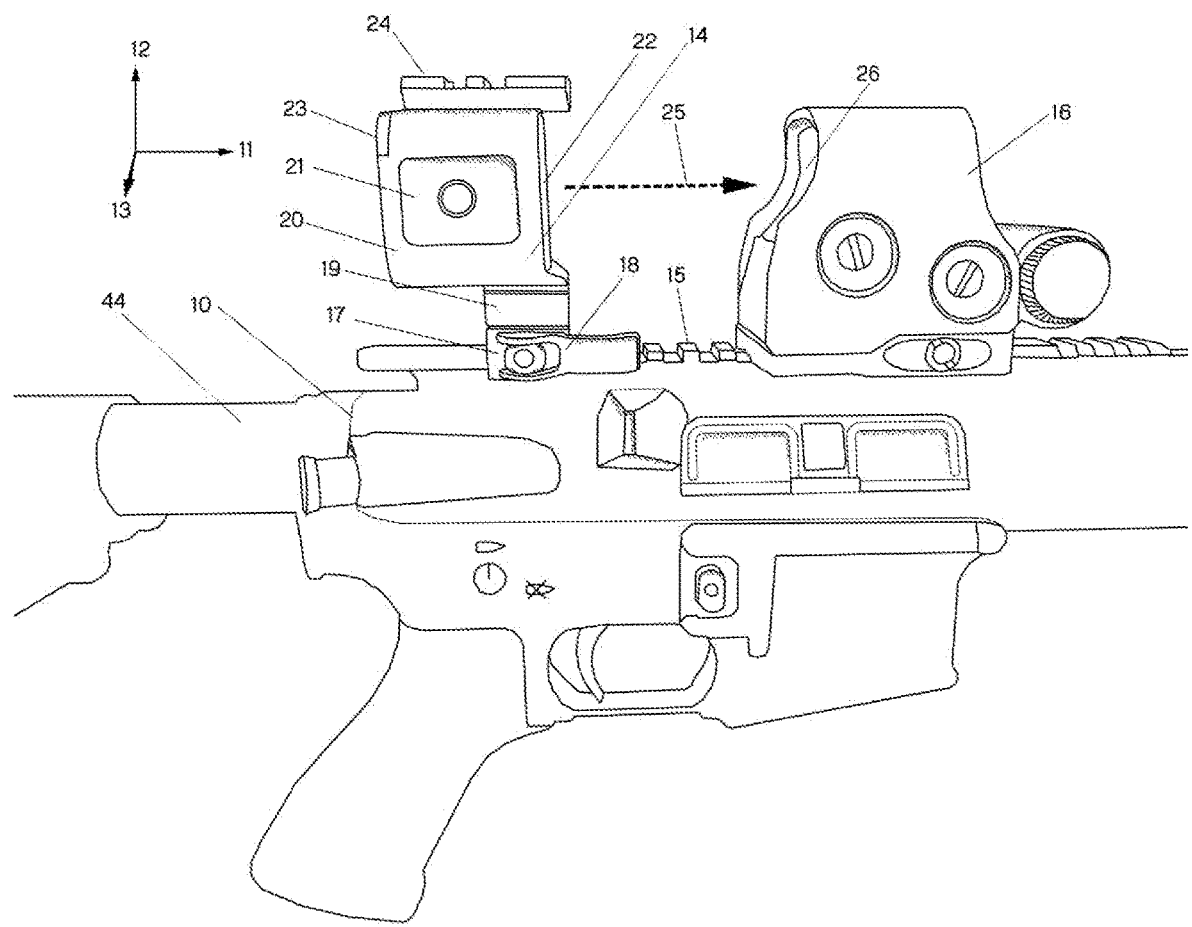
FIG. 1 shows an embodiment of the mount adapted to the rail of a rifle with an optic.

In FIG. 1, a gun 10 with an optic 16 is depicted at a side view. To assist in description, an axes system is defined whereby the arrow at 11 indicates the horizontal axis, the arrow at 12 indicates the vertical axis, and the arrow at 13 indicates the lateral axis. In this embodiment, the mount 14 engages to the accessory rail 15 of the gun 10 via the mount's gun engagement surface 17. In this embodiment, the mount 14 has a quick-release lever 18 to assist in the convenient and rapid removal of the mount 14 from the accessory rail 15 of the gun 10 while still allowing the mount 14, when installed on the gun 10, to be rigidly affixed to the gun 10. In alternative embodiments, it is contemplated that the mount's gun engagement surface 17 may use screws, pins, or another mechanical fastener. In additional alternative embodiments, the mount's gun engagement surface 17 may be configured to be affixed to an alternative surface or component of the gun 10 such as the stock 44. It is contemplated that the mount 14 may be constructed from or a combination of various materials including but not limited to aluminum, steel, or polymer, though many different materials may be used in the construction of the mount 14. Fabrication methods to make the mount 14 may include but are not limited to casting, CNC machining, and additive manufacturing.

In this embodiment, the mount 14 comprises of a gun engagement surface 17, a camera housing 20, a vertical positioning portion 19, an accessory rail 24, and a gate 23. The gate allows for access to the camera 21 and its removal from the camera housing 20. The accessory rail 24 allows for the mounting of a secondary sight (not shown) of any kind. The vertical positioning portion 19 raises the camera housing 20 vertically upward from the gun engagement surface 17. In this embodiment, the vertical positioning portion 19 positions the camera housing 20 to be at the ideal position so that once the camera 21 is placed within the housing 20, the camera lens 22 is at the ideal vertical position to peer through the optic viewing window 26 of the optic 16. The gun engagement surface 17 may be repositioned along the accessory rail 15 of the gun 10 to adjust for the ideal horizontal distance 25 that is relative between the camera lens 22 and the optic viewing window 26 to achieve the desired effect of capturing first person video footage through the optic 16. It is contemplated that in other exemplary embodiments and depending on the make and model of the camera 21, that the camera housing 20 may simply be any means of engaging or affixing the vertical positioning portion 19 to the camera 21 itself. That said, the term camera housing 20 may generally refer to an engagement apparatus for the camera 21.

Figure 2:
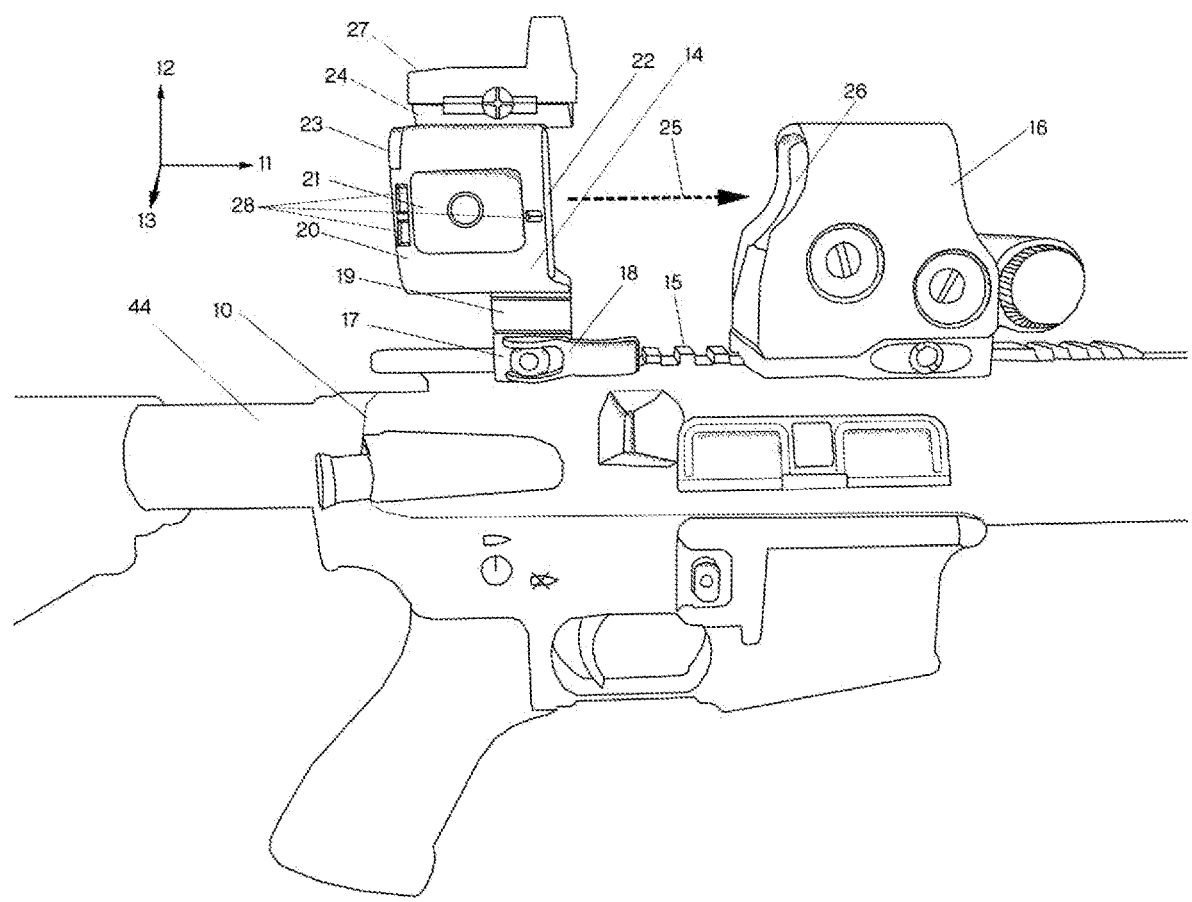
FIG. 2 shows the embodiment of the mount in FIG. 1 with secondary aiming means.

In FIG. 2, the embodiment of the mount 14 from FIG. 1 is shown with additional features. Upon filming through the optic 16, the camera 21 may block the shooter's view through the optic viewing window 26. Therefore, an alternative means of aiming is necessary. In this embodiment, the mount 14 has an accessory rail 24 attached to it. Attached to the accessory rail 24 is a secondary sight 27. A secondary sight 27 may, but is not limited to, take the form of a red dot or holographic optic. The secondary sight 27 has a reticle (not shown) that is adjustable and would be zeroed to be coincident with the point of aim of the optic 16. In short, when the optic 16 is aiming at a target (not shown), the secondary sight 27 is aiming at the same target. This would allow for the shooter to aim using the secondary sight 27 while the camera 21 blocks the direct view through the optic viewing window 26. In alternative embodiments, it is contemplated that an accessory rail 24 may be mounted on the vertical top or the lateral sides of the camera housing 20, or proximal to the gun engagement surface 17. An accessory rail 24 allows for the mounting of a secondary sight 27—all manner of common rail attachments including but not limited to a red dot, holographic sight, or laser (not shown) may be affixed. In other embodiments, it is contemplated that an accessory rail 24 may be affixed directly to the camera 21. Additionally, the accessory rail 24, in alternative embodiments, may be substituted for an alternative attachment means such as KeyMod or M-LOK. Just as the accessory rail 24 depicted allows for the combination of an alternative aiming device (e.g. the secondary sight 27) with the mount 14, it should not be construed as being limited to merely a rail—it is, foremost, best described as and functions as an engagement surface.

In FIG. 2, an iron sight 28 is affixed to the camera housing 20 proximal to the camera 21. The iron sight 28 may be used as a means of aiming while the camera especially for short distance targets while requiring no battery or power that may be required from the secondary sight 27. The secondary sight 27 should be zeroed to the same point of aim or range that the optic 16 is also zeroed at thereby allowing the shooter to utilize said secondary sight 27 for rapid, accurate aiming while the camera 21 films the perspective of the optic 16 as the shooter operates the gun 10. Mounting a secondary sight 27 to the lateral sides of the camera housing 20 may be preferential and highly beneficial to a shooter to maintain a consistent point of aim of the secondary sight 27 relative to the point of aim of the optic 16—especially since the optic would be vertically closer in terms of position to the vertical position of the optic viewing window 26 as opposed to the vertically top-mounted position depicted in this figure. A left-handed shooter may prefer the secondary sight 27 affixed to the lateral right side of the mount 14 for ease of use whereas a right-handed shooter may prefer the secondary sight 27 to be affixed to the lateral left side of the mount 14. Affixing a secondary sight 27 to the vertical top of the mount 14, as it is depicted in this figure, and attached via an accessory rail 24 may be advantageous for short range shooting and therefore zeroed for such a distance. It is contemplated that the means of mounting, in this case an accessory rail 24, may be angled vertically downward to accomplish a successful zero of the secondary sight 27 at short range to bring the reticle (not shown) of the secondary sight 27 vertically downward and allowing it to aim lower than the secondary sight would normally be able to aim were it not positioned vertically as high. It is contemplated in other embodiments that the iron sight 28 may be part of the camera 21 or camera housing 20 itself. Similarly, it is contemplated that the secondary sight 27 may be, in alternative embodiments, affixed directly to the camera 21 or camera 20 housing of the mount 14 itself and may be positioned on the lateral sides of the mount, behind the mount, or even at the vertical top of the mount 14 as depicted here.

Figure 3:
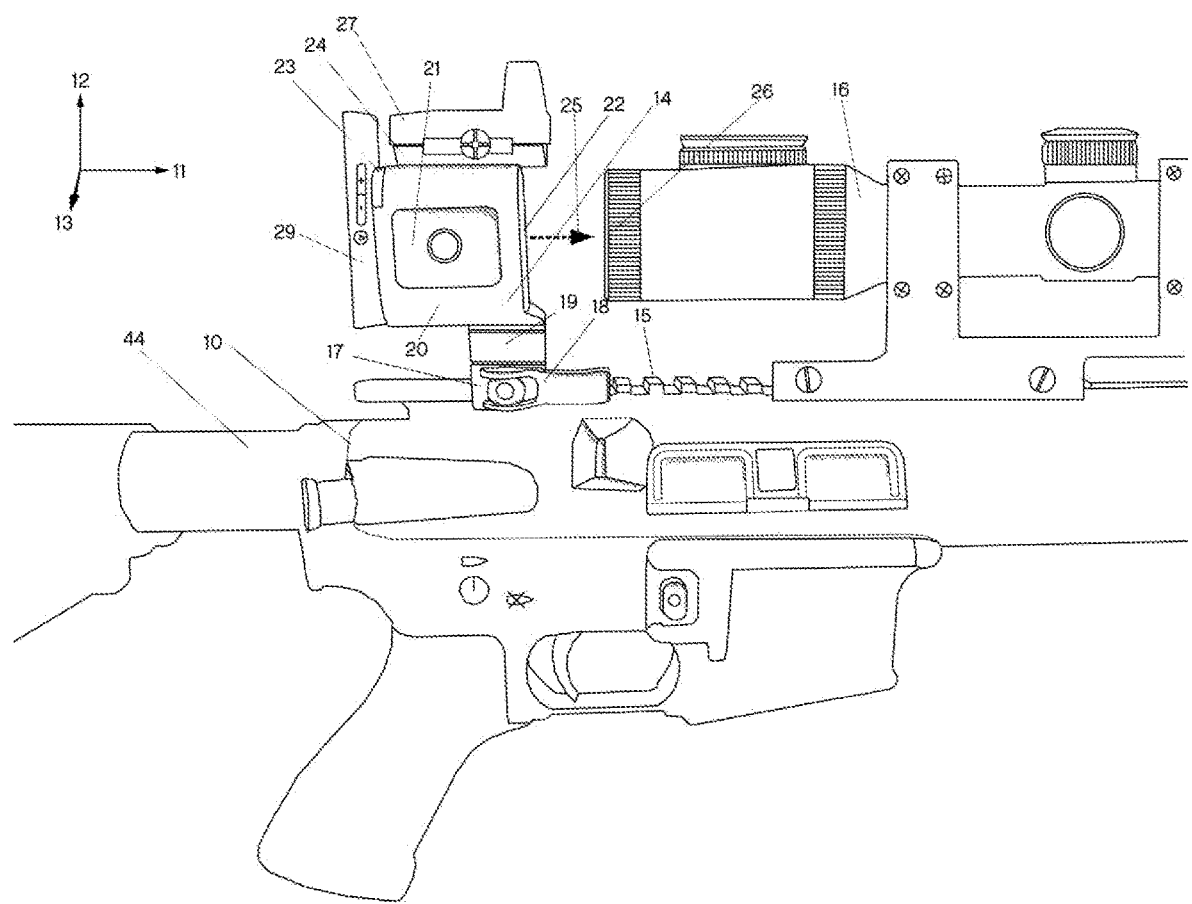
FIG. 3 shows an embodiment of the mount with a means of aiming with a screen.

In FIG. 3, an alternative embodiment of the mount 14 is shown for use with a magnified optic 16. While a secondary sight 27 may provide excellent and fast short and medium range target acquisition, many optics can vary their magnification. To allow for the use of magnification through the optic 16 while filming via the camera 21, a screen 29 proximal to the camera 20 may be used to display the optic's perspective. Some cameras 21 have an integral screen (not shown) to accomplish this but many cameras connect wirelessly to another device with a screen 29 to view the perspective of the camera 21. Whether they are physically connected, integral, or wireless connected, it can be said that the screen 29 is synced to the camera 21. The screen 29 may allow the shooter to access the camera's 21 functionality and controls and may be used to also assist with aiming using the optic 16 being filmed through. It is contemplated that the screen 29 may be affixed to and a part of the camera 21 or the camera may be affixed to the camera housing 20. A screen 29 may be used in conjunction with a secondary sight 27. Logically, the secondary sight 27 is ideally suited for aiming at short range targets while the camera 21 films, whereas the screen can take advantage of the magnification of the optic 16 when shooting longer ranges is required. That said, it is contemplated that a shooter would find it useful to combine the use of the screen 29 in conjunction with a secondary sight 27 to engage targets at various ranges without difficulty and while being able to continuously film through the camera 12.

Figure 4:
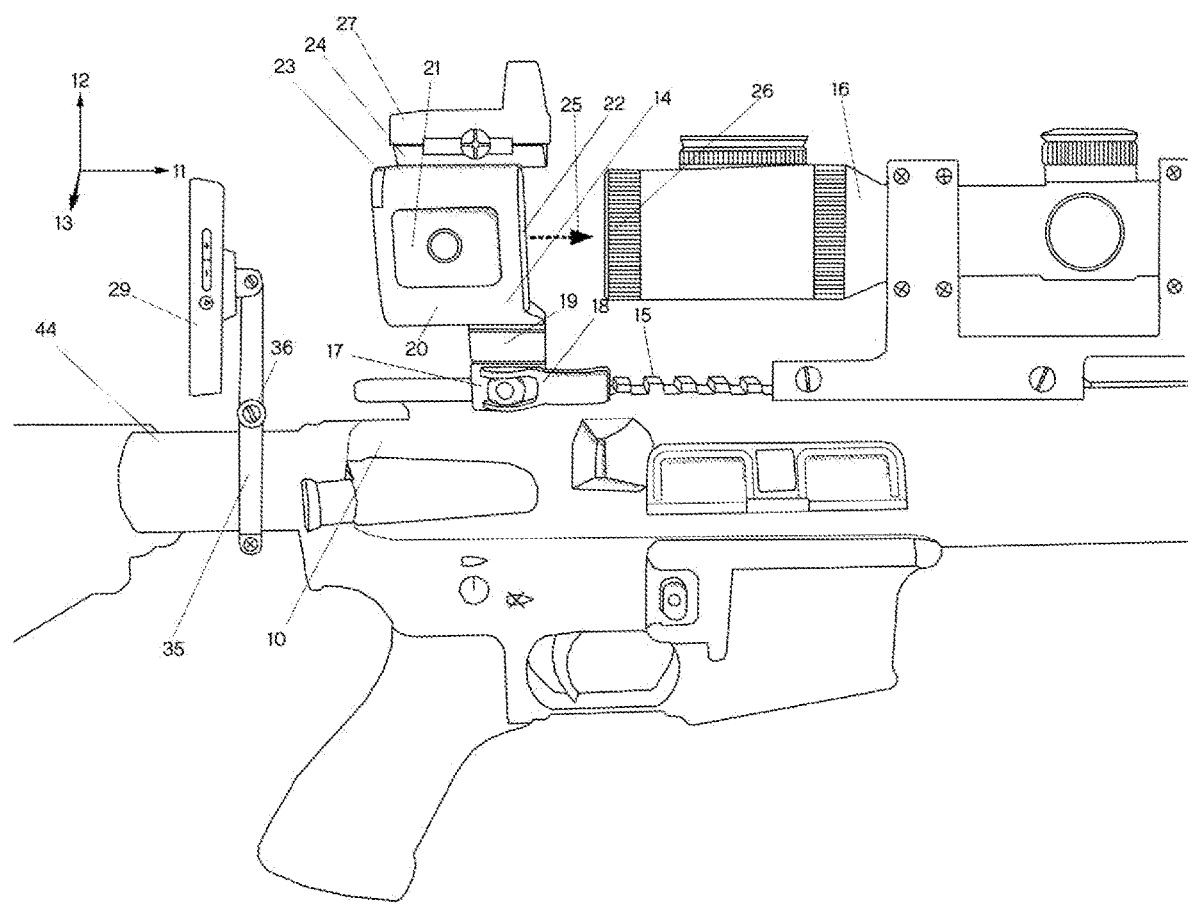
FIG. 4 shows the embodiment of the mount shown in FIG. 3 with a screen separate from the camera.

In FIG. 4, the embodiment of the mount 14 from FIG. 3 is modified to have the screen 29 further separated from the camera 21 and affixed to another part of the gun 10—specifically in this case on the stock 44 of the gun 10. This embodiment of the mount 14 anticipates the use of a wireless connection between the camera 21 and the screen 29, which may take the form of a smart phone, but is not limited to it. Here a stock mount 35 is shown holding up the screen 29. The stock mount 35 contains a swivel stud 36 allowing the screen 29 to be folded vertically downward towards the stock 44 to put the screen out of the way of the shooter, should it be necessary or allow the shooter greater convenience. Again, the screen 29 may be used as an interface to control the camera 21 and it may be convenient to minimize the screen's space if not being currently used.

Figure 5:
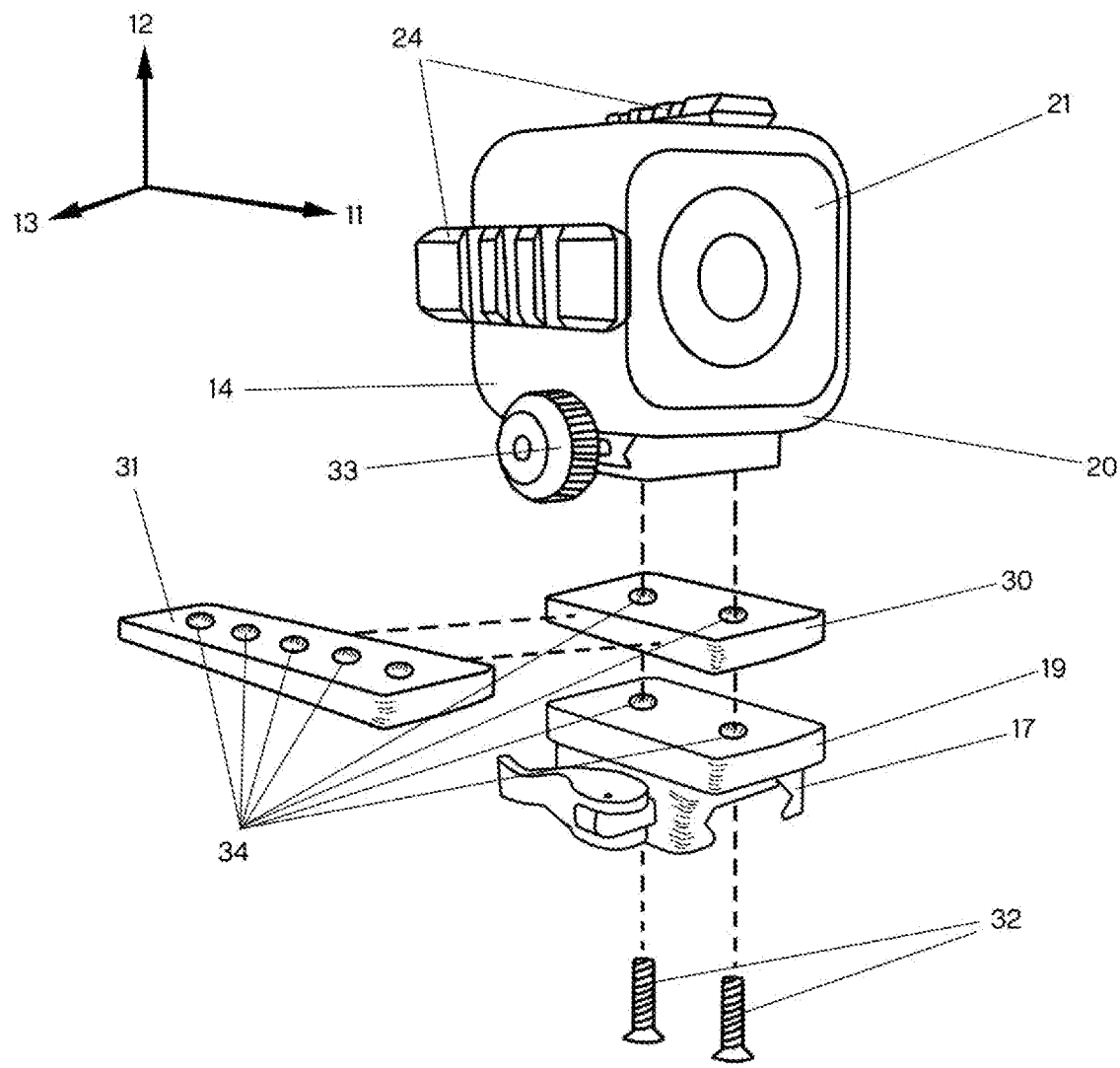
FIG. 5 shows an exploded view of an exemplary embodiment of the mount.

In FIG. 5, an exploded view of an exemplary embodiment of the mount 14 is shown. This specific embodiment allows the camera to be adjusted along the horizontal 11, vertical 12, and lateral 13 axes. The camera 21 sits within the camera housing 20. The housing has a plurality of accessory rails 24 affixed to the sides of the camera housing 20. The camera housing 20 (and therefore also the camera 21) can be shifted laterally back and forth using the lateral adjustor 33 knob. It is contemplated that common alternatives to knobs may be used in its place. The vertical positioning of the camera housing 20 may be altered by using a vertical adjustor 30 spacer. The vertical adjustor 30 spacer may have many different heights ranging from small to large to allow the mount 14 to be readily adapted for different optics (not shown). It is contemplated that other means of vertical adjustment aside from spacers may be used in other embodiments of the mount 14 such as a sliding rail (not shown). The vertical adjustor 30 spacer, camera housing 20, vertical positioning portion 19, and gun engagement surface 17 may all be combined with the use of fasteners 32 going through holes 34, resulting in an assembled mount 14. Alternatively, should a manner of horizontal and vertical adjustment to the position of the camera housing 20 be desired, the elongated alternative spacer 31 may be used in conjunction with, or in place of the vertical adjustor 30 spacer. The alternative adjustor 31 spacer provides the advantage of allowing the camera 21 to sit horizontally further away from the optic even if there is no additional accessory rail space (not shown) horizontally behind the gun engagement surface 17. Allowing for vertical, lateral, and horizontal adjustment, even if only minor, provides immense utility for the mount 14 in that the camera 21 may adapt to various optics (not shown) and their subtle differences in dimension. Once adjusted, the mount 14 provides a superb means to record through an optic (not shown) while able to adjust for being slightly off center laterally, or a little too close horizontally to the optic for example.

Additionally, this embodiment shows multiple accessory rails 24. These provide ample space and options for attaching secondary sights (not shown). It is contemplated that accessory rails may be placed in alternative locations on the mount such as being affixed to the vertical positioning portion 19.

Figure 6:
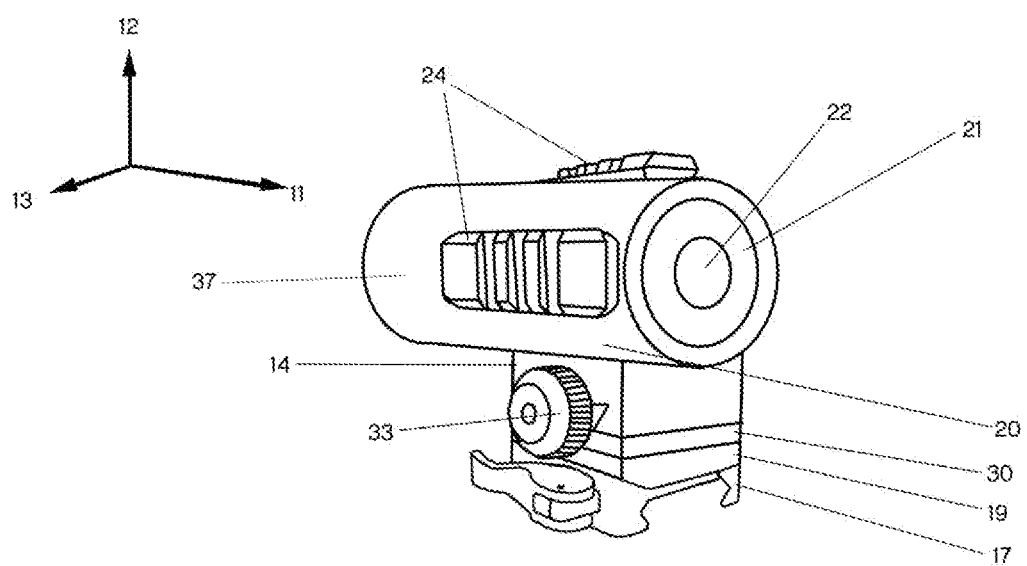
FIG. 6 shows a perspective view of an embodiment of the mount with alternative camera housing.

In FIG. 6, a perspective view of an alternative embodiment of the mount in FIG. 5 is shown. The mount 14 utilizes an alternative camera housing 37 shape that is substantially cylindrical. Many cameras have different external shapes and dimensions. The camera 21 shown here demonstrates some of the variety of cameras in terms of their physical profile. The shape of the camera 21 or the position of the camera lens 22 relative to the center of the alternative camera housing 37 (i.e. off-set or not directly centered) is not a limitation of the mount 14. Regardless of the shape of the alternative camera housing 37, the gun engagement surface 17 together with the vertical positioning portion 19, vertical spacer 30, and lateral adjustor 33 position the alternative camera housing 37, camera 21, and camera lens 22 into the ideal position from which to record through an optic (not shown). Additionally, adding a secondary sight (not shown) to an accessory rail 24 would provide a means of aiming while recording through the optic (not shown) at an ideal first-person point of view.

Figure 7:
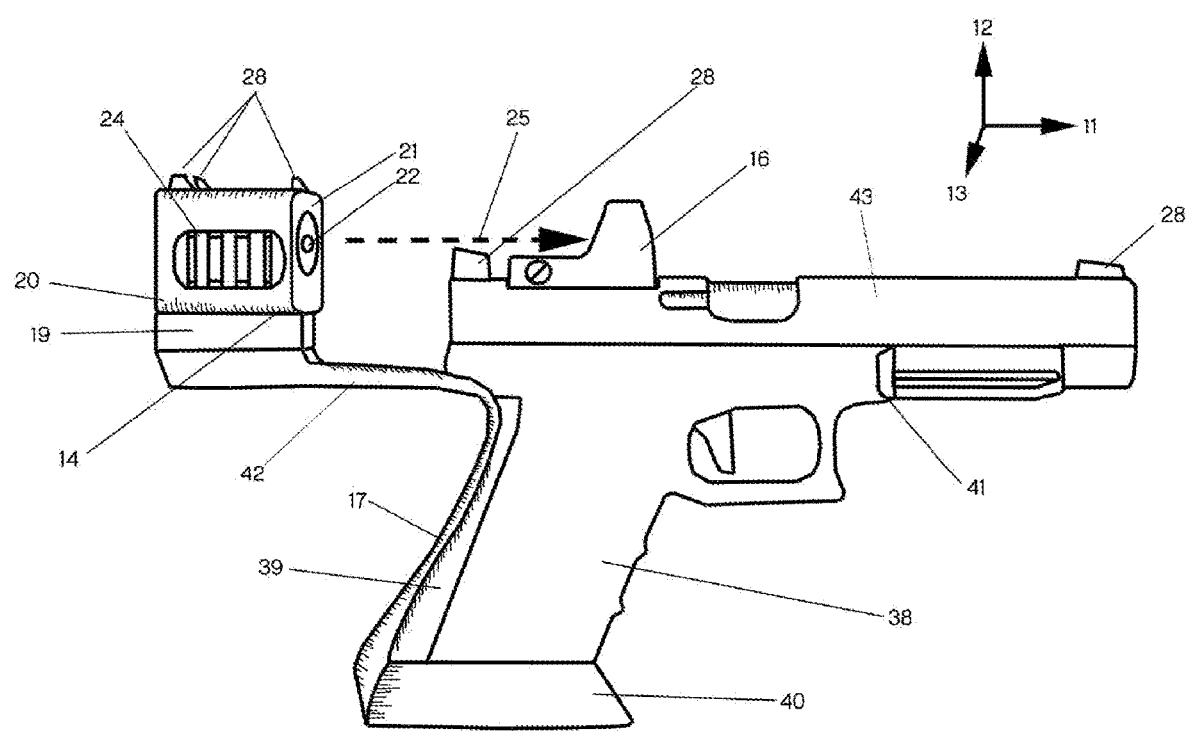
FIG. 7 shows a side view of an embodiment of the mount fitted for use on a handgun.

In FIG. 7, a handgun 41 is depicted having a handgun frame 38, a backstrap 39, a magazine well 40, a slide 43, iron sights 28, and an optic 16. The lateral 13, horizontal 11 and vertical axes 12 are defined with their corresponding arrows. The mount 14 is configured to position the camera housing 20, camera 21, and camera lens 22 directly at the ideal relative horizontal distance 25 between the camera lens 22 and the optic 16. Additionally, the camera 21 is positioned horizontally rearward away from the slide 43 of the handgun 41 so the slide 43 will not impact the camera 21 when the handgun 41 is fired and the slide 43 moves horizontally rearward. The gun engagement surface 17 is rigidly affixed to the handgun frame 38. In this embodiment, the gun engagement surface 17 may also be affixed to the magazine well 40, or separately affixed only to the magazine well 40. The gun engagement surface 17 is shown connecting to the extension boom 42 which is proximal to the backstrap 39 of the handgun 41 allowing the shooter to grip the frame 38 and mount 14 simultaneously. It is recommended that the extension boom 42 be rigid and strong. It is contemplated that in alternative embodiments that the gun engagement surface 17 may affix to an alternative point on the handgun frame 38 such as the backstrap 39. In this embodiment, the mount 14 features redundant iron sights 28 and an accessory rail 24 for mounting a secondary sight (not shown).

Figure 8:
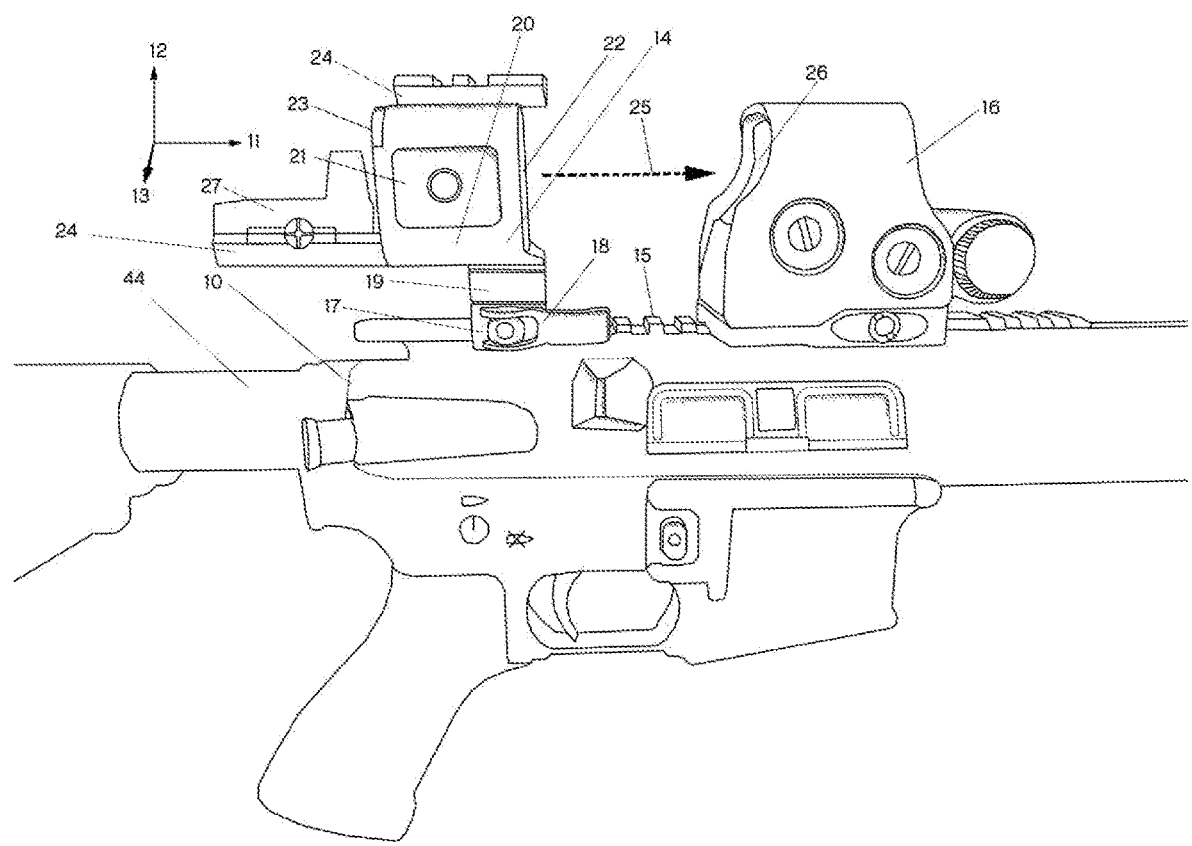
FIG. 8 shows an embodiment of the mount in FIG. 1 using an unconventional secondary sight configuration.

In FIG. 8, a perspective view of an alternative embodiment of the mount in FIG. 1 is shown. The mount 14 features a secondary sight 27 positioned horizontally behind the camera 21 and camera housing 20. It is common practice that when using reflex, red dot, holographic, or similar sights the shooter can aim rapidly by aiming with both eyes open due to how the brain superimposes the perspectives from each eye. When doing this, the shooter can see the red dot or other reticle (not shown) of the secondary sight 27 as well as the target they are aiming at simultaneously, regardless of the mount 14, camera 21, or camera housing blocking the optic 16 being filmed through. The secondary sight 27 is depicted as being attached to an accessory rail 24 jutting out horizontally behind the camera housing 20, though it is contemplated that other attachment means may be used to position the secondary sight horizontally behind the camera 21. This "behind the camera" position of the secondary sight 27 may have the added benefit of maintaining an ultra-consistent zero being substantially in line with (or coaxial to) of the optic 16 being filmed through.

Figure 9:
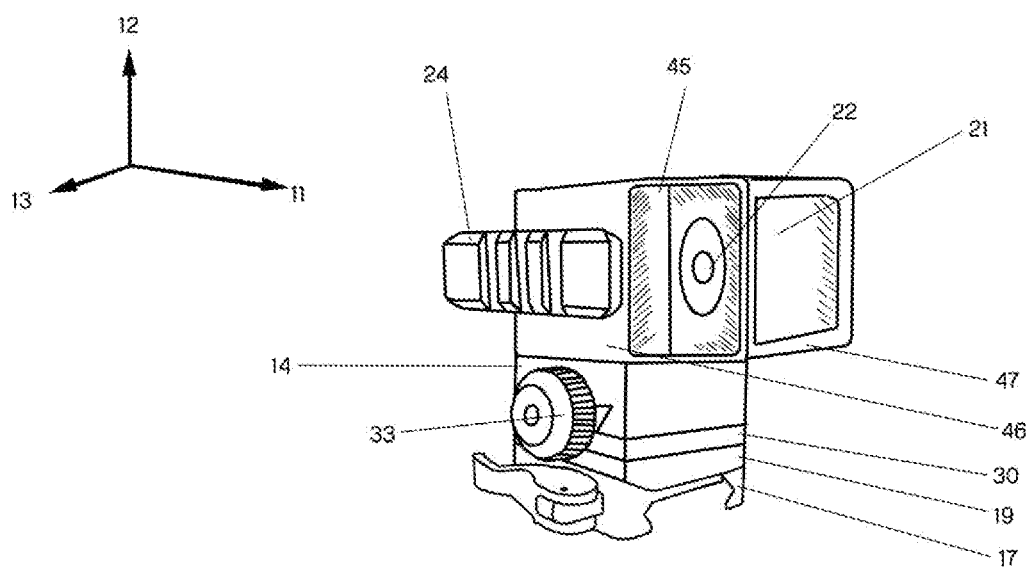
FIG. 9 shows a perspective view of an alternative embodiment of the mount of FIG. 5 configured to utilize a prism.

In FIG. 9, a perspective view of an alternative embodiment of the mount of FIG. 5 is shown configured to use a prism 45 to still allow the shooter to use the optic (not shown) being filmed through. This embodiment of the mount 14 utilizes a prism 45 that allows light to both reflect into the camera lens 22 at an approximately 90-degree angle while also allowing light to pass through the prism 45. The camera's housing is unique here in that it is orientated in a way that is not directly behind and the optic (not shown) and peering into it directly—hereafter this shall be called prism-orientated camera housing 47. Prism orientated camera housing 47 is adjacent to the prism housing 46 and pre-positions the camera 21 in the optimal place for light reflected from the prism 45 to be received by the camera lens 22. This embodiment of the mount 14 allows the shooter to use the optic (not shown) while also having the option of installing a secondary sight (not shown) on the accessory rail 24. This is especially advantageous in the use case of filming through a low power variable optic (not shown) where filming may require the shooter to rapidly switch between short range targets and long range targets. The short range reflex sight (not shown) that could be installed on the accessory rail 24 and could allow the shooter to engage short range targets more rapidly while still filming through the optic (not shown) in a higher magnified state.

Figure 10:
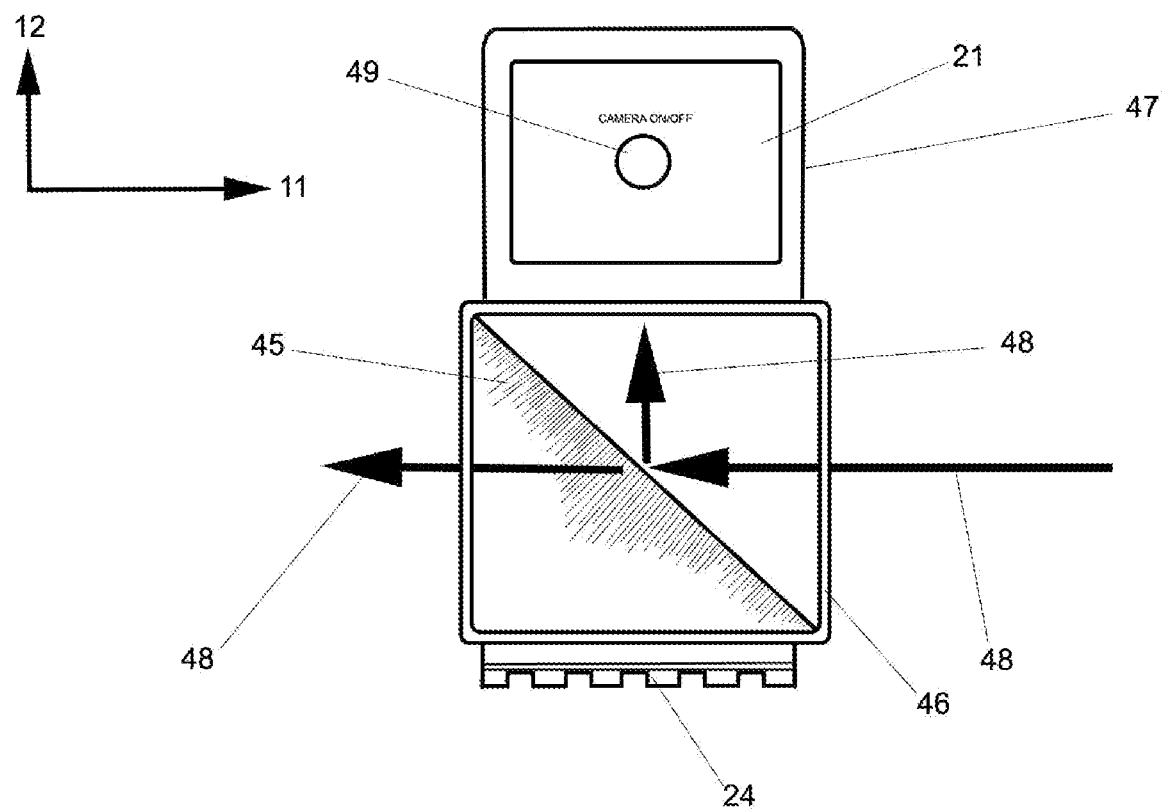
FIG. 10 shows a top view of the mount of FIG. 9.

FIG. 10 shows a top view of the mount of FIG. 9. Here the prism 45 and prism housing 46 can be more easily seen. When light meets the prism 45 the light pathway 48 splits and takes two paths. One path leads along the lateral axis 12 into the camera lens (not shown) of the camera 21 which is contained within the prism-orientated camera housing 47, whereas the other path continues along the horizontal axis 11 through the prism 45, whereby the optic (not shown) being filmed through can be seen by the shooter. To the side of the prism housing 46 there is an accessory rail 24 for mounting a secondary sight (not shown). A camera function button 49 can be seen on the camera 21—this was included in this drawing to better illustrate where the camera 21 was located within the prism-orientated camera housing 47.

Although the description above contains many specificities, these should not be construed as limiting the scope of embodiments but as merely providing illustrations of some of several embodiments. It will be apparent to those skilled in the art that various modifications and variations can be made to the disclosed mount. Other embodiments will be apparent to those skilled in the art from consideration of the specification and practice of the disclosed mount. It is intended that the specification and examples be considered as exemplary only.

What is claimed is:

1. A camera mount apparatus configured to engage a camera and to be affixed to a gun behind an optic of a gun having an optic, the apparatus comprising:
   a gun engagement surface;
   a vertical positioning portion;
   a camera housing to engage said camera;
   and a secondary sight,
   whereby said camera mount apparatus enables said camera to record through said optic while said gun is aimed using said secondary sight, and
   said camera is positioned to record both an optic view through said optic and a surrounding view of said optic.

2. The camera mount apparatus of claim 1, wherein the camera housing further includes an accessory rail.

3. The camera mount apparatus of claim 1, wherein said secondary sight is affixed directly to said camera housing.

4. The camera mount apparatus of claim 3, wherein said secondary sight is affixed behind said camera.

5. The camera mount apparatus of claim 1, wherein said gun is a handgun having a handgun frame, said camera mount apparatus further includes an extension boom connecting said gun engagement surface to said vertical positioning portion and said gun engagement surface is affixed to said handgun frame, and said extension boom positioned behind said gun.

6. A camera mount apparatus configured to engage a camera and to be affixed to a gun behind an optic of a gun having an optic, the apparatus comprising:
   a gun engagement surface;
   a vertical positioning portion;
   a camera housing to engage said camera;
   and one or more accessory rails proximal to said camera housing, whereby said accessory rails can readily receive a secondary sight with which the camera mount apparatus would enable said camera to record through said optic while said gun is aimed using said secondary sight whereby said camera is positioned to record both an optic view through said optic and a surrounding view of said optic.

7. The camera mount apparatus of claim 6, wherein the camera mount housing further includes iron sights proximal to said camera housing.

8. The camera mount apparatus of claim 6, wherein said gun is a handgun having a handgun frame, said camera mount apparatus further includes an extension boom connecting said gun engagement surface to said vertical positioning portion and said gun engagement surface is affixed to said handgun frame, and said extension boom positioned behind said gun.

9. A camera mount apparatus configured to engage a camera and to be affixed to a gun behind an optic of a gun having an optic, the apparatus comprising:
   a gun engagement surface;
   a vertical positioning portion;
   a prism-orientated camera housing to engage said camera;
   a prism, said prism divides an optic view into said camera and into a shooter's eye,
   whereby said prism would enable said camera to record through said optic while said gun is aimed using said optic;
   and a prism housing enclosing said prism whereby said prism housing is adjacent to said prism-orientated camera housing, and
   whereby said camera is positioned to record both an optic view through said optic and a surrounding view of said optic.

10. The camera mount apparatus of claim 9, wherein the camera housing further includes an accessory rail.

11. The camera mount apparatus of claim 9, wherein the camera housing is connected to said prism housing enclosing, and the camera housing is positioned above the prism housing enclosing.

12. The camera mount apparatus of claim 9, wherein the camera housing is connected to said prism housing enclosing, and the camera housing is positioned horizontally with respect to the prism housing enclosing.

* * * * *